United States Patent
Joshi et al.

(10) Patent No.: US 9,167,588 B1
(45) Date of Patent: Oct. 20, 2015

(54) ENHANCED MOBILE STANDBY PERFORMANCE DURING SIMULTANEOUS DUAL-TECHNOLOGY COMMUNICATION BY AVOIDING INTERFERENCE SCENARIOS

(71) Applicant: QUALCOMM Incorporated, San Diego, CA (US)

(72) Inventors: Rohit Joshi, Uttarakhand (IN); Aditya Bohra, Gujarat (IN); Bhaskara Viswanadham Batchu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 14/252,880

(22) Filed: Apr. 15, 2014

(51) Int. Cl.
*H04W 4/00* (2009.01)
*H04W 72/08* (2009.01)
*H04W 72/10* (2009.01)
*H04W 72/02* (2009.01)
*H04W 88/06* (2009.01)

(52) U.S. Cl.
CPC ............ *H04W 72/082* (2013.01); *H04W 72/02* (2013.01); *H04W 72/10* (2013.01); *H04W 88/06* (2013.01)

(58) Field of Classification Search
CPC ..................................................... H04W 88/06
See application file for complete search history.

(56) References Cited

U.S. PATENT DOCUMENTS

| 8,200,161 | B2 | 6/2012 | Walley et al. | |
| 8,908,656 | B2 * | 12/2014 | Sadek et al. | 370/336 |
| 2009/0040937 | A1 * | 2/2009 | Xhafa et al. | 370/252 |
| 2009/0296785 | A1 | 12/2009 | Wu et al. | |
| 2010/0304685 | A1 | 12/2010 | Wietfeldt et al. | |

(Continued)

OTHER PUBLICATIONS

"3rd Generation Partnership Project; Technical Specification Group Radio Access Networks; Evolved Universal Terrestrial Radio Access (E-UTRA); Study on signalling and procedure for interference avoidance for in-device coexistence; (Release 10)", 3GPP Standard; 3GPP TR 36.816, 3rd Generation Partnership Project (3GPP), Mobile Competence Centre ; 650, Route Des Lucioles ; F-06921 Sophia-Antipolis Cedex; France, vol. RAN WG2, No. v1.2.1, Apr. 25, 2011, pp. 1-40, XP050692493, [retrieved on Apr. 25, 2011] the whole document.

(Continued)

*Primary Examiner* — Justin Lee
(74) *Attorney, Agent, or Firm* — The Marbury Law Group, PLLC

(57) ABSTRACT

The various embodiments include methods and apparatuses for avoiding interference scenarios during concurrent communication of dual-technology wireless communication devices. Interference scenarios may be avoided by predicatively determining the potential for interference between the channels of multiple communications on the dual-technology wireless communication devices. For a pending communication, a predicative calculation may be made to determine whether the channel of the pending communication and the channel of an active communication may interfere with each other. If so, the communication with a lower priority may switch to the highest powered channel that does not interfere with the higher priority communication. Once the interference condition expires, and the lower priority communication persists, its channel may switch to a higher power channel that will not cause interference with any active or pending communications. Switching the channel for a communication may be prompted by electromagnetic interference from components of the dual-technology wireless communication devices.

20 Claims, 7 Drawing Sheets

(56) References Cited

U.S. PATENT DOCUMENTS

2012/0087341 A1    4/2012   Jang et al.
2012/0149412 A1*   6/2012   Nergis et al. .................. 455/501
2013/0029704 A1    1/2013   Koo et al.
2013/0295950 A1*  11/2013   Ruuska et al. ............. 455/452.1
2014/0221029 A1*   8/2014   Chen et al. .................... 455/501

OTHER PUBLICATIONS

International Search Report and Written Opinion—PCT/US2015/020578—ISA/EPO—May 29, 2015.

* cited by examiner

ENHANCED MOBILE STANDBY PERFORMANCE DURING SIMULTANEOUS DUAL-TECHNOLOGY COMMUNICATION BY AVOIDING INTERFERENCE SCENARIOS

BACKGROUND

Some new designs of wireless communication devices—such as smart phones, tablet computers, laptop computers, and routers—contain hardware and/or software elements that provide access to multiple wireless communication networks. For example, a wireless communication device can have more than one radio frequency communication circuits (often referred to as "RF chains") for accessing one or more wireless local area networks ("WLANs") and/or wireless wide area networks ("WWANs"). When multiple reception ("Rx") and/or transmission ("Tx") operations are implemented, or co-exist, on a wireless communication device, these operations may overlap and interfere with each other.

This operation interference may occur in a wireless communication device with one or more RF chains. In a wireless communication device with multiple RF chains, the antennas of the RF chains may be in close proximity to each other. This close proximity may cause one RF chain to desensitize or interfere with the ability of another during the concurrent use of the RF chains. Also, in wireless communication devices with one or more RF chains, the antennas are in close proximity to other device hardware that may emit or absorb RF energy. The proximity of antennas to other device hardware may also cause the other hardware to interfere with the ability of one or more RF chains to transmit or receive during concurrent use of the other hardware and an RF chain.

Receiver desensitization ("de-sense"), or degradation of receiver sensitivity, may result from noise interference from a nearby transmitter or other hardware. In particular, when two radios are close together with one transmitting on the uplink and the other receiving on the downlink, the feedback from the transmitter may be picked by the receiver or otherwise interfere with reception of a weaker signal (e.g., from a distant base station). As a result, the received signals may become corrupted and difficult or impossible to decode. Further, feedback from the transmitter can be detected by a power monitor that measures the receive signal, which would cause the mobile device to falsely determine the presence of a base station. In particular, receiver de-sense may present a challenge in multi-radio devices due to the necessary proximity of transmitter and receiver.

Other problems can occur in a wireless communication device with multiple RF chains. When executing multiple concurrent Tx operations the transmissions may create a disruptive intermodulation product or a battery current limit problem. Tx signals of different, but close, frequencies may be transmitted concurrently. Because Tx signals produce sideband noise on either side of a carrier frequency, the sideband noise may be of a frequency that overlaps with the frequency of another Tx signal. The concurrent transmission of overlapping frequencies can result in unwanted amplitude modulation causing noise on those overlapping frequencies and making it more difficult for receivers to distinguish signals. The battery current limit problem results from the power demands on the battery to concurrently transmit signals. The battery may not be able to provide sufficient current to multiple Tx chains, resulting in weaker signals and battery drain.

In a wireless communication device with one RF chain, multiple operations may require the use of the same function of the RF chain at the same time. For example, if two Rx operations are occurring at the same time, only one operation can have access to the Rx portion of the RF chain (or "Rx chain") at a time. This may result in a prolonged delay or cancellation of the Rx operation that does not get to use the Rx chain.

SUMMARY

The methods and apparatuses of various embodiments provide circuits and methods for controlling communication in a mobile device, including determining whether a potential for interference between a first communication on a first channel and a second communication on a second channel exceeds a threshold when no more than one of the first communication or the second communication is a transmission, the first communication is an active communication, and the second communication is an inactive but pending communication scheduled to be active concurrently with the first communication, determining priorities for the first communication and the second communication to identify a higher priority communication and a lower priority communication, selecting a next highest power channel for the lower priority communication in response to determining that the potential for interference between the first communication and the second communication when only one of the first communication or the second communication is a transmission exceeds the threshold, determining whether a potential for interference between the first communication and the second communication exceeds the threshold when the lower priority communication uses the next highest power channel and only one of the first communication and the second communication is a transmission, and assigning the lower priority communication to the next highest power channel in response to determining that the potential for interference between the first communication and the second communication when the lower priority communication uses the next highest power channel does not exceed the threshold.

In some embodiments, the method may further include repeating operations of selecting the next highest power channel for the lower priority communication and determining whether the potential for interference between the first communication and the second communication exceeds the threshold when the lower priority communication uses the next highest power channel and only one of the first communication or the second communication is a transmission until a power channel is selected for the lower priority communication for which the potential for interference between the first communication and the second communication does not exceed the threshold.

In some embodiments, the method may further include assigning the lower priority communication to a highest power channel in response to determining that the potential for interference between the first communication and the second communication no longer exists.

In some embodiments, determining whether the potential for interference between the first communication on the first channel and the second communication on the second channel exceeds the threshold when only one of the first communication or the second communication is a transmission is based on the potential for interference between the first channel and the second channel and on a potential for interference with circuitry of the mobile device.

In some embodiments, determining whether the potential for interference between the first communication and the second communication exceeds the threshold includes effects of electromagnetic radiation emitted by circuitry of the mobile device other than an antenna.

Various embodiments include a mobile device having a first RF chain, a second RF chain and a processor coupled to the first and second RF chains in which the processor is configured to perform operations of one or more of the embodiment methods described above.

Various embodiments include a non-transitory processor-readable medium having stored thereon processor-executable instructions configured to cause a processor to perform operations of one or more of the embodiment methods described above.

Various embodiments include a mobile device including means for performing functions of one or more of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
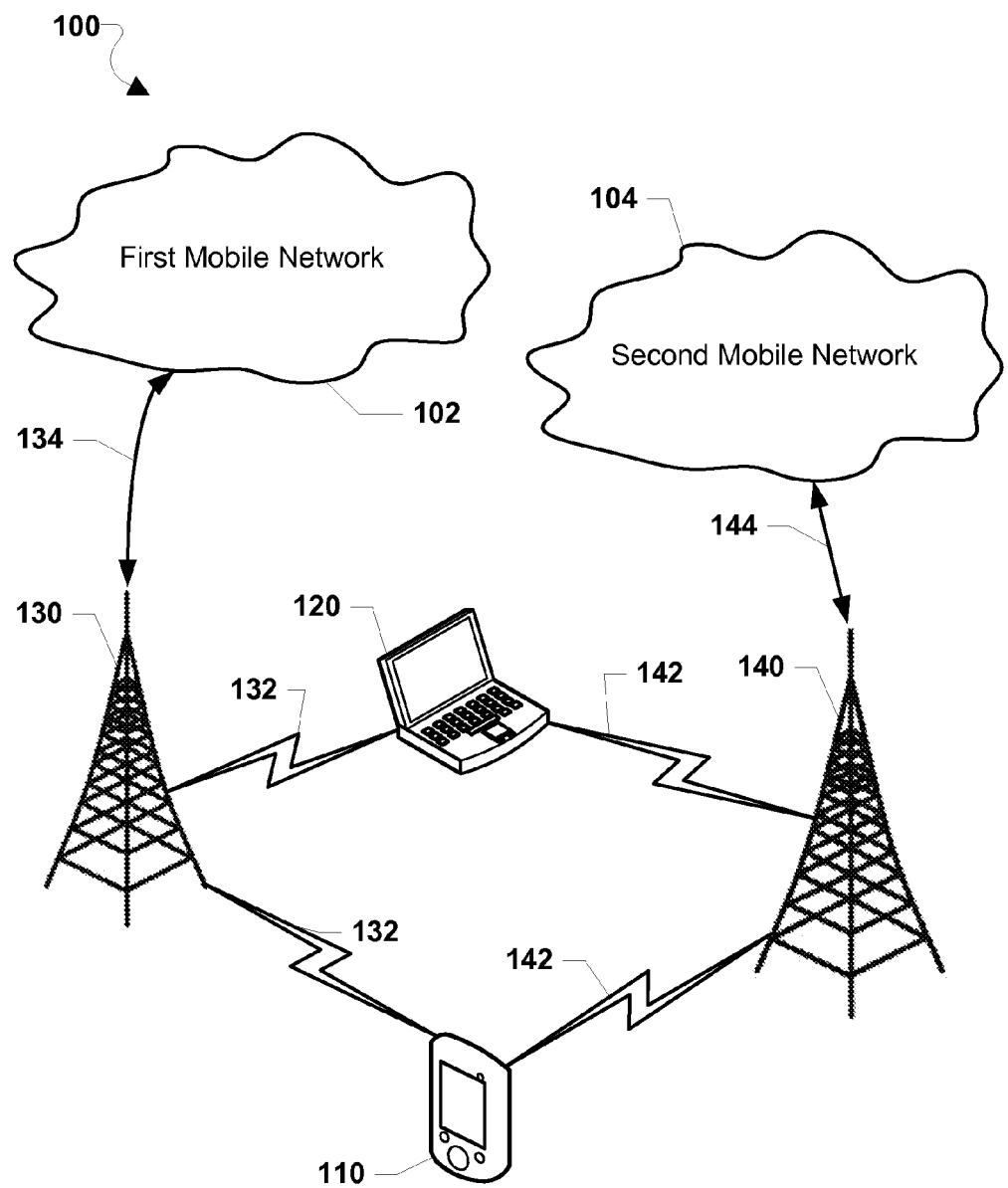
FIG. 1 is a communication system block diagram illustrating a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing device," "mobile device," and "wireless communication device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor and wireless communication circuitry. As used herein, the term "dual-technology device" refers to a wireless communication device (mobile device) that includes at least two mobile communication networks. While the various embodiments are particularly useful for mobile devices, such as smartphones, the embodiments are generally useful in any electronic device that implements radio hardware in close proximity to other hardware.

Descriptions of the various embodiments refer to a dual-technology devices for exemplary purposes, because the embodiments may be suitable for any multiple-technology wireless communication device that may individually maintain a plurality of connections to a plurality of mobile networks through one or more radio communication circuits. For example, the various embodiments may be implemented in multi-SIM multi-active devices of any combination of number of subscriber identity modules (SIM) and concurrently active subscriptions. Moreover, a SIM may not be required for a wireless communication device to implement the various embodiments, which may apply to any form of wireless communication.

Dual-technology devices enable a user to connect to different mobile networks (or different accounts on the same network) while using the same dual-technology device. For example, a dual-technology device may connect to GSM, TDSCDMA, CDMA2000, WCDMA and other radio frequency networks. In the various embodiments, dual-technology devices may also include two RF chains so that each network communication supported by each RF chain can be accomplished concurrently if interference problems are managed.

Dual-technology devices can suffer from interference between two communications being accomplished concurrently, such as when one communication session is transmitting ("Tx") at the same time as another RF chain is attempting to receive ("Rx"). As used herein, the term "victim" refers to the communication service or subscription suffering from interference at a given instant and, the term "aggressor" refers to the communication service or subscription whose Rx or Tx actions are causing the interference. In an example dual-technology device, the victim may be attempting to receive RF signals from a network while the aggressor attempts to transmit RF signals to another network. In an example of such interference, an aggressor's transmissions may de-sense the victim's reception, in which case the victim may receive the aggressor's transmissions that act as noise and interfere with the victim's ability to receive wanted RF signals.

In dual-technology devices, an aggressor's transmissions may cause severe impairment to the victim's ability to receive transmission. This interference may be in the form of blocking interference, harmonics, intermodulation, and other noises and distortion. Such interference may significantly degrade the victim's receiver sensitivity, link to a network, voice call quality and data throughput. These effects may result in a reduced network capacity for the affected communication service or subscription. The aggressor's transmission may also cause the victim to experience a receiver sensitivity that is drastically degraded, call quality degradation, higher rates for call drops and radio link failures, and data throughput degradation, which may potentially cause the victim to lose a data connection.

Other problems that may occur in a wireless communication device with multiple RF chains include, for example, an aggressor Tx circuit producing a noise inducing Tx operation, and a victim Tx circuit being interfered with. When executing multiple concurrent Tx operations the aggressor transmission may create a disruptive intermodulation product or a battery current limit problem. With multiple Tx operations, sideband noise on either side of a carrier frequency of the aggressor Tx signal may overlap with the frequency of the victim's Tx signal. The concurrent transmission of overlapping frequencies can result in unwanted amplitude modulation causing noise on those overlapping frequencies that may make it more difficult for receivers to distinguish the two transmission signals.

In another example, a battery current limit problem resulting from the power demands on the battery to concurrently transmit signals may result in a Tx chain amplifying an interfering signal. Also, the battery may not be able to provide sufficient current to the other multiple Tx chains, resulting in weaker signals and battery drain. In either of these examples, the aggressor Tx circuit interferes with the other Tx operation or draws more power from the power source. In such circumstances the Tx chain receiving the interfering signal or not being apportioned sufficient power to properly execute its Tx operation is the victim.

The various embodiments include methods for avoiding the potential for interference, de-sense and other Rx/Tx collision issues that can result from the execution of concurrent communications by two radio technologies in order to minimize the impact on the performance of the wireless communication device. In various embodiments, a multi-technology device may be configured with a co-existence manager implemented within the operating software and/or hardware of the device that predicts a potential interference of communications by two radio technologies when one of the radio technologies is about to acquire service, such as during a cell handover operation or recovering from an out-of-service condition, and cause one of the radio technologies to select a different channel for communications to avoid the potential for interference. As is standard in many cellular communication technologies, a radio technology will normally select a channel having the highest available power (e.g., highest receive power) with which to establish service. The co-existence manager may use the highest power channel to determine whether transmit and receive services on that channel will interfere with or be interfered by communications (i.e., transmissions and/or receptions) by the other radio technology on its current channel. This determination of interference may also consider whether interference on that channel will occur with other circuits in the communication device (i.e., the determination may consider all potential sources of interference). When the co-existence manager determines that there is a potential for interference between the two radio technologies (i.e., transmit vs. receive, receive vs. transmit, transmit vs. transmit, and/or receive/transmit vs. other circuits) if service-acquiring radio technology uses the highest power channel, the co-existence manager, or another module or process, may determine the potential for interference if the service-acquiring radio technology selects the next highest power channel available (i.e., the next lower power available channel). If there is little or no predicted interference, the service-acquiring radio technology may acquire service using that next-highest power channel; but if co-existence manager predicts there will or may be interference with that channel, the co-existence manager may select the next highest power channel and the process may be repeated until the co-existence manager determines that there will not be interference on a selected channel. In this manner, the embodiments ensure that interference does not occur by properly selecting a channel for service instead of managing interference after service is established on a channel.

In embodiment, the co-existence manager may assign a priority to each radio technology based on the type or nature of the communications being carried by each radio technology. For example, a radio technology used for conducting voice calls may be assigned higher priority than a radio technology used for data services. Thus, in a dual-technology device (i.e., a wireless communication device that can transmit/receive via two different radio technologies, one radio technology may be assigned high priority (the "high priority radio technology") and the other radio technology may be assigned low priority (the "low priority radio technology"). The co-existence manager (or another software or hardware module in the device) may use the assigned radio technology priorities to select the radio technology that will be shifted to another channel in order to prevent interference from happening. In this embodiment, when a radio technology is about to acquire service (e.g., in a cell handover operation or when exiting an out-of-service state) the co-existence manager may use the highest power channel available to the service-acquiring radio technology to determine whether transmit and receive services on that channel will interfere with or be interfered by communications (i.e., transmissions and/or receptions) by the other radio technology on its current channel. If the co-existence manager determines that there is a potential for interference between the two radio technologies, the co-existence manager may determine whether there would be interference between the high priority radio technology on its highest power channel and the low priority radio technology on its next highest power channel. Thus, if the service-acquiring radio technology has lower priority, the co-existence manager will predict interference using the next highest power of the service-acquiring radio technology; but if the service-acquiring radio technology has higher priority, the co-existence manager will predict interference using that next highest power of the lower priority radio technology (i.e., the radio technology that is already in service). The process of predicting the potential for interference between the two radio technologies will continue using incrementally lower power channels of the lower priority radio technology until a suitable channel for that radio technology is identified. At that point, the higher priority radio technology may be permitted to acquire (or continue to use) its highest power channel and the lower priority radio technology may switch to using the identified compatible channel (i.e., the channel for the lower priority radio technology that will enable simultaneous communications by both radio technologies).

In an embodiment, the co-existence manager of the device may be informed when a radio technology is schedule to attempt to acquire service or transfer to a new cell (i.e., about to conduct a cell handover), and begin the process of predicting interference between the two radio technologies on various channels in response.

By predicting interference between the two radio technologies using incrementally lower power channels for the lower priority radio technology (or the service-acquiring radio technology), the embodiment methods enable service to be established on the highest power channels that will enable concurrent communications on both radio technologies without interference.

As noted above, the co-existence manager may predict the potential for interference of a service-acquiring radio technology based on all potential sources of interference, including interference from other device components, alone and in combination with interference from the other radio technology communications. In doing so, the co-existence manager may determine whether the total amount of predicted interference exceeds a threshold (e.g., a threshold of acceptable interference), and if so select the next-highest (i.e., next lower) power channel for the lower priority radio technology. If the selecting the lowest power channel for the lower priority radio technology will not prevent unacceptable interference, such as may occur if the higher priority radio technology is receiving interference from another device circuit, the co-existence manager may select the next-highest channel for the high priority radio technology and repeat the process beginning with the highest power channel available to the lower priority radio technology. In this manner the embodiment methods may enable channel selections to be made before service is established that avoids interference from all sources.

The various embodiments may be implemented within a variety of communication systems 100, such as at least two mobile telephony networks, an example of which is illustrated in FIG. 1. A first mobile network 102 and a second mobile network 104 are typical mobile networks that include a plurality of cellular base stations 130 and 140. A first dual-technology device 110 may be in communication with the first mobile network 102 through a cellular connection 132 to a first base station 130. The first dual-technology device 110 may also be in communication with the second mobile network 104 through a cellular connection 142 to a second base station 140. The first base station 130 may be in communication with the first mobile network 102 over a connection 134. The second base station 140 may be in communication with the second mobile network 104 over a connection 144.

A second dual-technology device 120 may similarly communicate with the first mobile network 102 through a cellular connection 132 to a first base station 130. The second dual-technology device 120 may communicate with the second mobile network 104 through a cellular connection 142 to the second base station 140. Cellular connections 132 and 142 may be made through two-way wireless communication links, such as 4G, 3G, CDMA, TDSCDMA, WCDMA, GSM, and other mobile telephony communication technologies. Other connections may include various other wireless connections, including WLANs, such as Wi-Fi based on IEEE 802.11 standards, and wireless location services, such as GPS.

Figure 2:
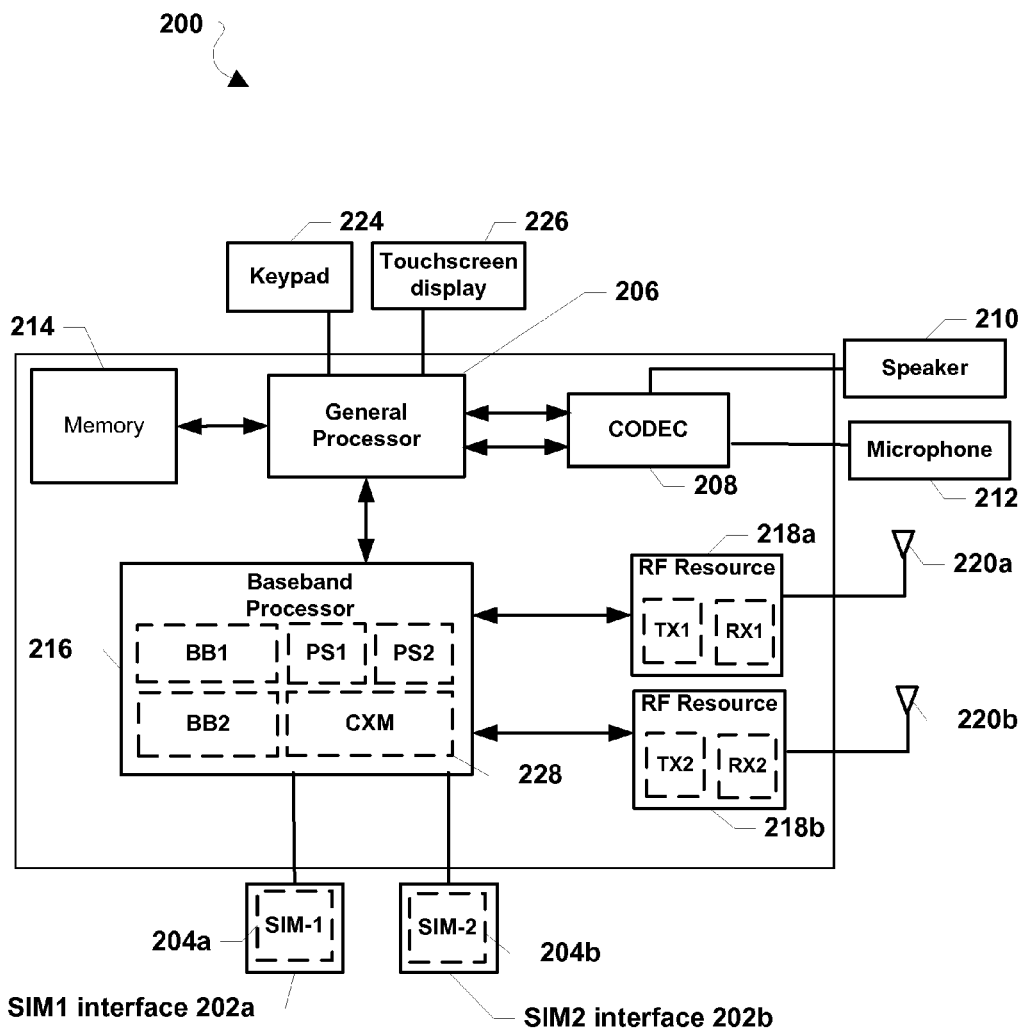
FIG. 2 is a component block diagram illustrating an embodiment dual-technology wireless communications device.

FIG. 2 illustrates an embodiment of a dual-technology device 200 (e.g., the dual technology device 110, 120 in FIG. 1) that is suitable for implementing the various embodiments. The dual-technology device 200 may include a first SIM interface 202a, which may receive a first identity module SIM-1 204a that is associated with the first subscription. The dual-technology device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an international mobile subscriber identity (IMSI), a set of SIM application toolkit (SAT) commands and storage space for phone book contacts. A SIM may further store a Home Public-Land-Mobile-Network (HPLMN) code to indicate the SIM card network operator provider. An Integrated Circuit Card Identity (ICCID) SIM serial number may be printed on the SIM for identification.

Each dual-technology device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain.

The memory 214 may store operating system (OS), as well as user application software and executable instructions. The memory 214 may also store application data, such as an array data structure.

The general purpose processor 206 and memory 214 may each be coupled to at least one baseband modem processor 216. Each SIM in the dual-technology device 200 (e.g., SIM-1 202a and SIM-2 202b) may be associated with a baseband-RF resource chain. Each baseband-RF resource chain may include baseband modem processor 216 to perform baseband/modem functions for communications on a SIM, and one or more amplifiers and radios, referred to generally herein as RF resources 218. In some embodiments, baseband-RF resource chains may interact with a shared baseband modem processor 216 (i.e., a single device that performs baseband/modem functions for all SIMs on the wireless device). Alternatively, each baseband-RF resource chain may include physically or logically separate baseband processors (e.g., BB1, BB2).

In some embodiments, the baseband modem processor 216 may be an integrated chip capable of managing the protocol stacks of each of the SIMs or subscriptions (e.g., PS1, PS1) and implementing a co-existence manager software 228 (e.g., CXM). By implementing modem software, subscription protocol stacks, and the co-existence manager software 228 on this integrated chip 216, thread based instructions may be used on the integrated chip 216 to communicate instructions between the software implementing the interference prediction, the mitigation techniques for co-existence issues, and the Rx and Tx operations.

RF resources 218a, 218b may be communication circuits or transceivers that perform transmit/receive functions for the associated SIM of the wireless device. The RF resources 218a, 218b may be communication circuits that include separate transmit and receive circuitry, or may include a transceiver that combines transmitter and receiver functions. The RF resources 218a, 218b may be coupled to a respective wireless antenna (e.g., a first wireless antenna 220a and a second wireless antenna 220b). The RF resources 218a, 218b may also be coupled to the baseband modem processor 216.

In some embodiments, the general purpose processor 206, memory 214, baseband processor(s) 216, and RF resources 218a, 218b may be included in the dual-technology device 200 as a system-on-chip. In other embodiments, the first and second SIMs 202a, 202b and their corresponding interfaces 204a, 204b may be external to the system-on-chip. Further, various input and output devices may be coupled to components on the system-on-chip, such as interfaces or controllers. Example user input components suitable for use in the dual-technology device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in dual-technology device 200 to enable communication between them, as is known in the art.

In some embodiments, the dual-technology device 200 may instead be a single-technology or multiple-technology device having more or less than two RF chains. Further, various embodiments may implement, single RF chain or multiple RF chain wireless communication devices with less SIM cards than the number of RF chains, including without using any SIM card.

Figure 3:
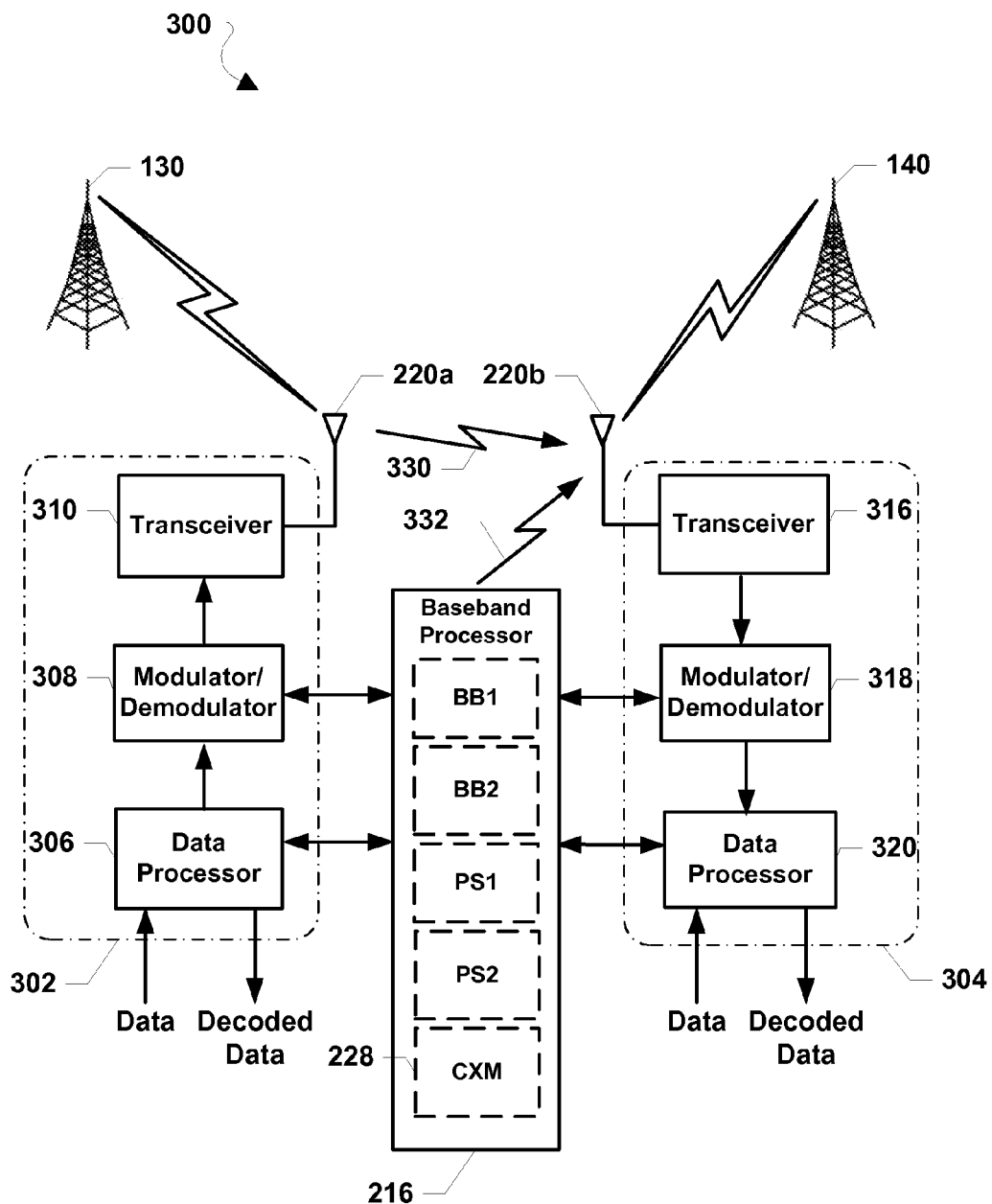
FIG. 3 is a component block diagram illustrating an interaction between components of different transmit/receive chains in an embodiment dual-technology wireless communications device.

FIG. 3 illustrates embodiment interactions between components of different transmit/receive chains in a dual-technology wireless communications device (e.g., 200 in FIG. 2). For example, a first radio technology RF chain 302 may be one RF resource 218a, and a second radio technology RF chain 304 may be part of another RF resource 218b, as described above with reference to FIG. 2. With reference to FIGS. 2 and 3, in some embodiments, the first and second radio technology RF chains 302, 304 may include components operable for transmitting data. When the wireless communications device is transmitting data, a data processor 306, 320 may format, encode, and interleave the data to be transmitted. A modulator/demodulator 308, 318 may modulate a carrier signal with encoded data, for example, by performing Gaussian minimum shift keying (GMSK). One or more transceiver circuits 310, 316 may condition the modulated signal (e.g., by filtering, amplifying, and up-converting) to generate a RF modulated signal for transmission. The RF modulated signal may be transmitted, for example, to the base station 130, 140 via an antenna, such as the antenna 220a, 220b.

The components of the first and second radio technology RF chains 302, 304 may also be operable to receive data. When receiving data the antenna 220a, 220b may receive RF modulated signals from the base station 130, 140 for example. The one or more transceiver circuits 310, 316 may condition (e.g., filter, amplify, and down-convert) the received RF modulated signal, digitize the conditioned signal, and provide samples to the modulator/demodulator 308, 318. The modulator/demodulator 308, 318 may extract the original information-bearing signal from the modulated carrier wave, and may provide the demodulated signal to the data processor 306, 320. The data processor 306, 320 may de-interleave and decode the signal to obtain the original, decoded data, and may provide decoded data to other components in the wireless device.

Operations of the first and second radio technology RF chains 302, 304 may be controlled by a processor, such as the baseband processor(s) 216. In the various embodiments, each of the first and second radio technology RF chains 302, 304 may be implemented as circuitry that may be separated into respective receive and transmit circuits (not shown). Alternatively, the first and second radio technology RF chains 302, 304 may combine receive and transmit circuitry (e.g., as transceivers associated with SIM-1 204a and SIM-2 204b).

Interference between the first and second radio technology RF chains 302, 304, such as de-sense and interpolation, may cause the desired signals to become corrupted and difficult or impossible to decode. For example, a transmission signal 330 sent by the first radio technology RF chain 302 may be errantly received by the second radio technology RF chain 304. To avoid such interference, the dual-technology device may implement an embodiment algorithm to select an optimal channel for the communication signals of the lower priority technology. Interference may also be caused by components of the dual-technology device emitting electromagnetic radiation. For example, electromagnetic radiation 332 in the radio frequency spectrum may be emitted by the baseband processor 216 and received by the second radio technology RF chain 304, causing or contributing to the overall interference of the second radio technology RF chain 304. Upon detecting the potential for interference from electromagnetic interference caused by hardware components of the dual-technology device, the dual-technology device may implement the algorithm to select an optimal channel for the communication signals for the potential victim or the potentially interfered with technology.

Figure 4:
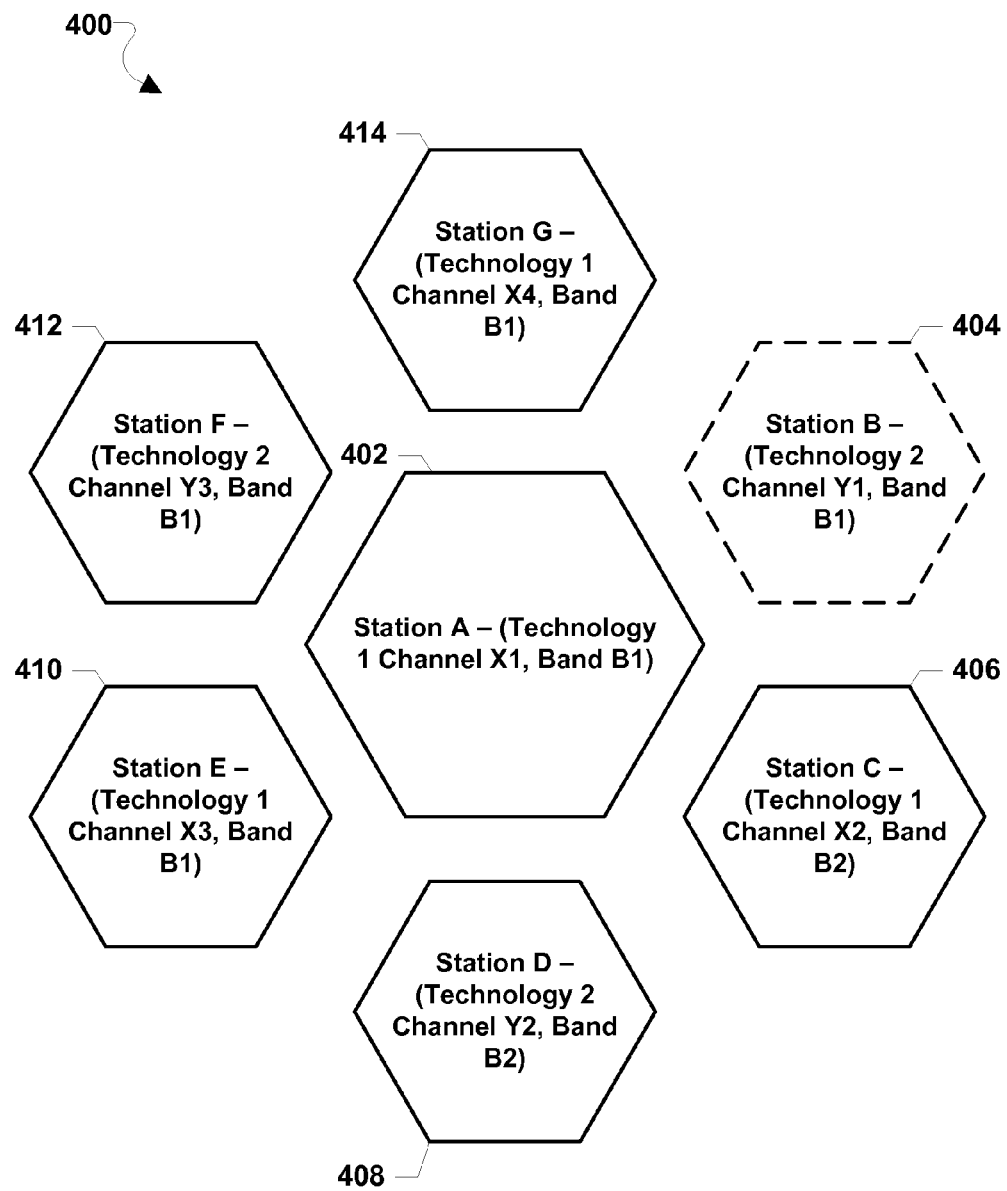
FIG. 4 is a schematic diagram of a number of cellular base stations of two different technologies.

FIG. 4 illustrates an interaction between an embodiment dual-technology device (e.g., 200 in FIG. 2) and a network suitable for use with the various embodiments. A network 400 may include a plurality of cells 402-414. Each of the cells 402-414 may be associated with a different base station (stations A-G) for communicating with the dual-technology device. Each of the cells 402-414 may have its own characteristics, including a supported technology, and a channel and a band for connecting to the cells 402-414. In some embodiments, each of the cells 402-414 may be its own network. In an example, the dual-technology device may include a first technology (technology 1) connected to, or camped on, the cell 402. The dual-technology device may be connected to station A using the first technology, and using channel X1 and band B1. The first technology may be connected to the cell 402 and communicate using the first technology and the cell 402. For this example, the first technology may have priority over a second technology (technology 2) of the dual-technology device. The second technology RF chain may be scheduled to handover or otherwise connect to the cell 404, at station B using channel Y1 and band B1, and communicate using the second technology.

In some embodiments, when a processor (e.g., 216 in FIG. 2) of the dual-technology device is informed of the intent or schedule of second technology RF chain to handover or otherwise connect to the cell 404, a co-existence manager (e.g., 228 in FIG. 2) executing on the processor may predict whether connecting the second technology using channel Y1 and band B1 may interfere with the connection between the dual-technology device and the cell 402 on the first technology using channel X1 and band B1. If interference is predicted, the co-existence manager may repeat the process of predicting interference considering other channels and other cells 408, 412 that are capable of communicating with the second technology. Thus, before assigning the second technology to one of the channels associated with one of the other cells 408, 412 supporting the second technology, the dual-technology device may determine whether the signals between the second technology and one of the other cells 408, 412 may interfere with the signals of the connection between the first technology and the cell 402. For example, the dual-technology device may predict whether connecting to the cell 408 using channel Y2 may interfere with the signals between the first technology and the cell 402. When no interference of the higher priority technology (in this case the first technology) is predicted, the dual-technology device may connect to the cell 408 for the second technology using channel Y2.

When interference is predicted, the dual-technology device may continue to predict whether interference on the connection between the higher priority technology and cell 402 may result from connecting the second technology to a cell using another channel.

The dual-technology device may select channels and cells to predict the potential for interference by the connection between the second technology and the cell 408, 412 in descending order of channel power. Thus, assuming channel Y2 for connecting the dual-technology device to the cell 408 using the second technology has higher power than channel Y3 for connecting the dual-technology device to cell 412 using the second technology, the dual-technology device may predict the potential for interference for channel Y2 first. When the dual-technology device determines there is a potential for interference on channel X1 being used by the first technology to connect to cell 402, the dual-technology device may predict the potential for interference on channel X1 when using channel Y3. When no potential interference is predicted, the dual-technology device may connect to cell 412 using channel Y3 and the second technology.

If the dual-technology device may predict that all of the channels for the second technology may interfere with the connection between the first technology and the cell 402, the dual-technology device may connect the lowest priority technology using the least interfering channel.

In determining the potential for interference, the dual-technology device may also consider any interference contribution from hardware components of the dual-technology device in order to determine a total interference potential. Thus, the embodiment methods may account for interference from internal components that exacerbates interference from signals from the other technology, and address interference that may occur even when the other technology is not active. For example, the dual-technology device may predict the potential for electromagnetic interference caused by the operation of the components of the dual-technology device on the channels for connecting one of the technologies to the cells 402-414. As in various embodiments, the dual-technology device may connect the technology to the cells 402-414 using the non-interfering, or least interfering channel.

Similarly, in various embodiments, the first technology may already be connected to the cell 402, and the second technology may attempt to connect to one of the cells 404, 408, and 412. The dual-technology device may predict the potential of the second technology (lower priority) making a connection to interfere with the existing connection for the first technology (higher priority), and the potential of the hardware components of the dual-technology device interfering with the existing and/or attempted connection from the first and second technologies.

Also, in some embodiments, the dual-technology device may predict whether an existing connection of a lower priority may interfere with a pending higher priority connection. In a different application of the predictive determination of the potential for interference, when interference is predicted, the existing lower priority connection may be moved to a different channel before the higher priority connection is initialized in order to avoid the potential interference.

Figure 5:
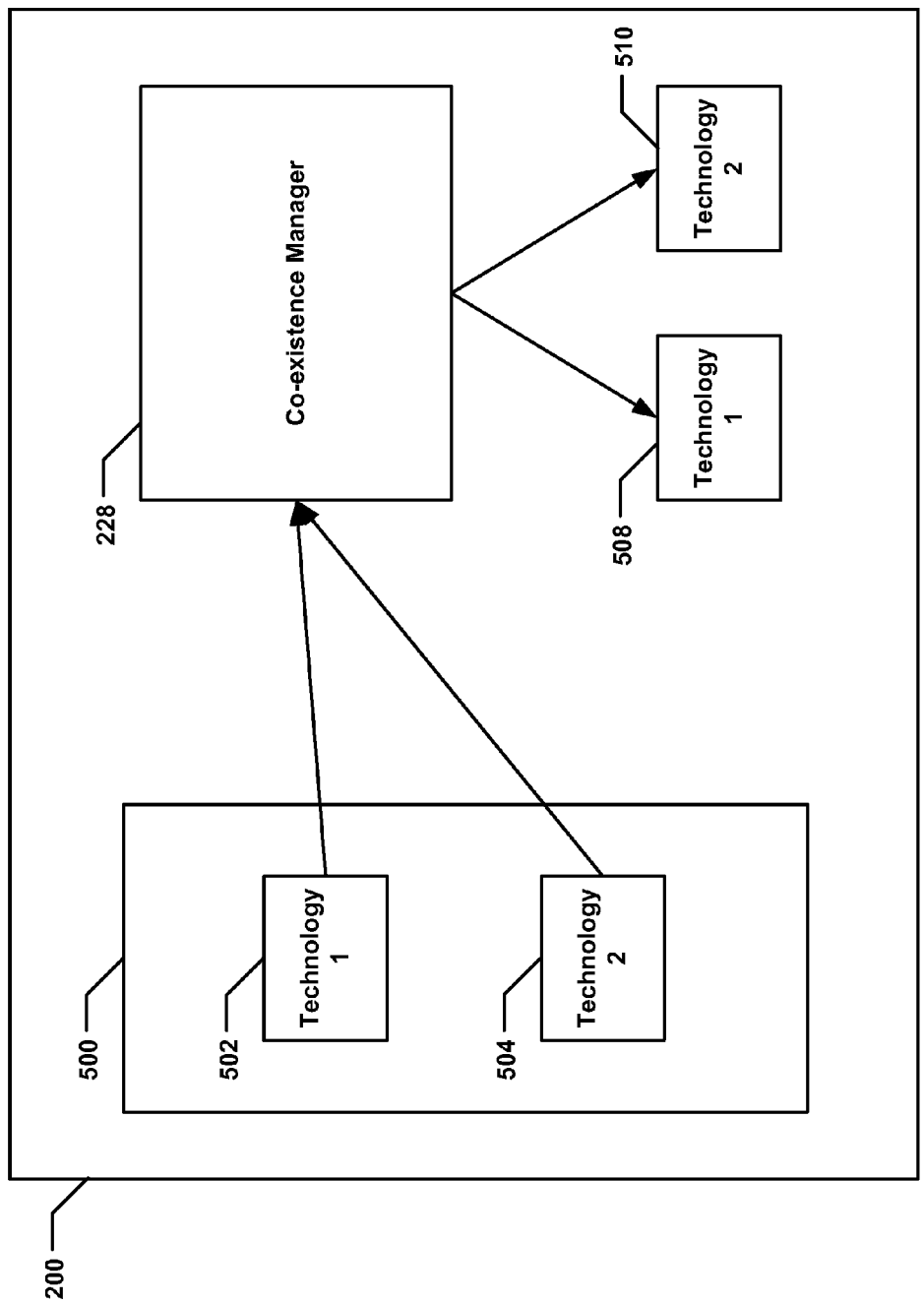
FIG. 5 is a functional block diagram illustrating an interaction between components of multiple technologies and a co-existence manager of an embodiment dual-technology wireless communication device.

FIG. 5 illustrates an interaction between components of multiple technologies and the co-existence manager 228 (FIG. 2) of the dual-technology device 200. With reference to FIGS. 2, 3 and 5, the dual-technology device 200 may include a common module 500 for specifying the channel and band for each technology hardware 508, 510. The technology hardware 508, 510 may include various embodiments of the components described with respect to the dual-technology device 200. Such components may include (but are not limited to) the SIM interfaces 202a and 202b, identity modules 204a and 204b, baseband modem processor 216, RF resources 218, wireless antennae 220a and 220b, and the first and second RF chains 302, 304. Part of the common module 500 may include further technology modules 502, 504 for the different technology hardware 508, 510. In this embodiment, two technology hardware 508, 510 for technology 1 and technology 2, and corresponding technology modules 502, 504 are shown. Such a description is exemplary, and the amount of technology modules and technology hardware may vary.

The technology modules 502, 504 may determine the initial channel and band for attempting to communication with one or more networks using the respective technology hardware 508, 510. The information of the channel and the band may be provided to the co-existence manager 228. In some instances, only one technology module 502, 504 may need to supply the channel and band information because the co-existence manager 228 may already know the information for one technology hardware 508, 510 based on an existing connection using one of the technology hardware 508, 510. Similarly, channel and band information for only one technology hardware 508, 510 may be needed because only one of the technology hardware 508, 510 may be connected or attempting to connect, while the other is idle.

The co-existence manager 228 may receive the channel and band information from the technology modules 502, 504, and use the information and the priority rankings of the technology hardware 508, 510 to predict whether the lower priority communication by one technology hardware 508, 510 may interfere with the higher priority communication of the other technology hardware 508, 510. The priority rankings may be preprogrammed into the co-existence manager 228 or provide to the co-existence manager 228 by the technology modules 502, 504. The co-existence manager 228 may determine the communication on which technology hardware 508, 510 is of a higher priority. The priority may depend on the hardware technology 508, 510, may depend on the communication, or may depend on a combination of the technology hardware 508, 510 and the communication. The co-existence manager 228 may calculate a predicted amount of interference that the lower priority communication on the assigned channel to the corresponding technology hardware 508, 510 may cause to the higher priority communication on the assigned channel to the corresponding technology hardware 508, 510 may.

When no interference is predicted, the co-existence manager 228 may signal the technology hardware 508, 510 to implement their communications as instructed by the technology modules 502, 504. When interference is predicted, the co-existence manager 228 may select the next highest power channel for the lower priority communication on the corresponding technology hardware 508, 510, and predict the interference with the new parameters. When interference persists, the co-existence manager 228 may repeat the process until it finds a channel for the lower priority communication on the corresponding technology hardware 508, 510 that does not interfere with the higher priority communication. When a non-interfering channel cannot be found, the co-existence manager 228 may assign the least interfering channel for the lower priority communication on the corresponding technology hardware 508, 510.

In some embodiments, the co-existence manager 228 receives channel and band information for only one communication on the corresponding technology hardware 508, 510. In such embodiments, the related priority may be unimportant, and the co-existence manager 228 may predict interference based on electromagnetic interference by components of the dual-technology device 200 on the channel for the communication. In various embodiments it may be possible to alter the operation of the components to avoid the interference of the channel for the communication by modifying the frequency at which the components operate. It is also possible for the co-existence manager 228 to select alternate channels for the communication in the same way as they are selected for the lower priority communication. The co-existence manager 228 may select the next highest power channel to predict the potential for interference by the components of the dual-technology device 200, until a non-interfered with, or least interfered with channel is identified.

Figure 6:
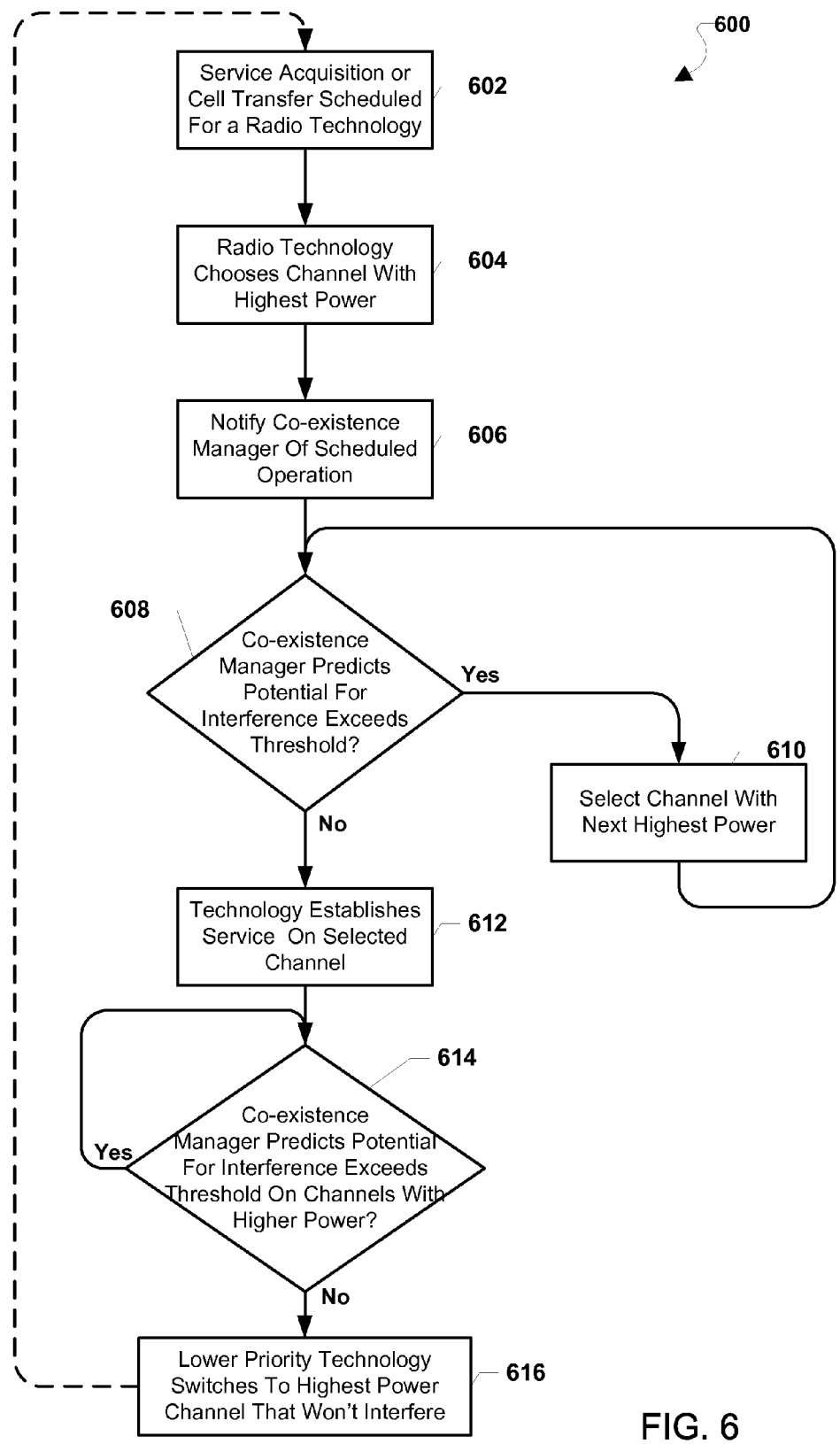
FIG. 6 is a process flow diagram illustrating an embodiment method for enhanced mobile standby performance during simultaneous dual-technology communication by avoiding interference scenarios.

FIG. 6 illustrates an embodiment method 600 for enhanced mobile standby performance during simultaneous dual-technology communication by avoiding interfering operating configurations. With reference to FIGS. 2-6, the dual-technology device 200, including the processor (e.g., 216 in FIG. 2), the memory (e.g., 214 in FIG. 2), the RF chains (e.g., 218a, 218b in FIG. 2), the co-existence manager (e.g., 228 in FIG. 2), and the other components described herein may implement this method 600. In block 602, a radio technology may be attempting to acquire service or scheduled to conduct a cell handover that will require the dual-technology communication to select a channel for connecting the radio technology to a cell. The potential for interference may occur when one of the radio technologies connects to a new cell or initiates a connection. In block 604, the dual-technology device (e.g., 200 in FIG. 2) may choose an appropriate channel with the highest power for the technology of the scheduled communication. The appropriate channel may depend on the radio technology and the network, including the local cells. While many technologies may transmit or receive communications, the technologies often are limited to a spectrum of radio frequency in which the technology can operate. From the limited space of channels for any particular communication, the technology, or software for the technology, like the technology modules of the common module, may select the highest power channel for the communication.

In block 606, the dual-technology device (e.g., 200 in FIG. 2) may inform the co-existence manager (e.g., 228 in FIG. 2) of the scheduled service/cell connection and the chosen channel. Informing the co-existence manager may entail providing the type of communication and parameters of the communication, such as the priority, technology, channel, and band for the communication. In some embodiments, some information related to scheduled connection, such as the priority of the communication, may be predetermined by the co-existence manager (e.g., 228 in FIG. 2) and therefore may not have to be provided to the co-existence manager. Priorities may be determined based on numerous factors, such as preprogrammed rankings, environmental factors, states of the dual-technology device, and service factors. Environmental factors may include, for example, time of day and location of the dual-technology device. States of the dual-technology device (e.g., 200 in FIG. 2) may include, for example, power, activity, temperature, connections, connection strength, quality and/or reliability, and connection alternatives. Service factors may include, for example, usage limits, fees, and capabilities.

In determination block 608, the dual-technology device 200 (e.g., co-existence manager 228) may predict or otherwise determine whether the potential for interference on communications of one or both of the radio technologies exceeds a threshold level of potential interference if the service-acquiring radio technology uses a selected channel. The threshold level of potential interference may be set at an amount of interference that could degrade the user experience, and sufficient interference to warrant taking actions to prevent. In other words, the dual-technology device (e.g., 200 in FIG. 2) may determine whether the potential for interference between a first communication on a first channel and a second communication on a second channel exceeds the threshold level of potential interference that could degrade the user experience. The co-existence manager (e.g., 228 in FIG. 2) may employ algorithms to calculate whether and how much interference may be expected on the channel of a higher priority communication by a specific technology, caused by the lower priority scheduled communication if the lower priority communication were to execute using the given channel. The calculated interference may be compared to a threshold, such as a level of interference above which actions should be taken to prevent the interference from happening. In some embodiments, the co-existence manager (e.g., 228 in FIG. 2) may also address the contribution to interference from components of the dual-technology device that generate electromagnetic emissions in determining whether the potential for interference exists. In this calculation, the dual-technology device (e.g., 200 in FIG. 2) may treat the electromagnetic radiation of device components as it would the higher priority communication. This determination of the potential for interference is performed before the service-acquiring radio technology is connected to a network, so that a non-interference channel (of one or the other of the two radio technologies) can be identified and used. Thus, the determination in block 608 is predictive rather than reactive.

In some embodiments, the prediction of interference in determination block 608 may be limited to predicting the potential for interference when no more than one of the communications by the two radio technologies is a transmission. In other words, the determination may not consider the potential for transmission versus transmission interference.

If the dual-technology device (e.g., 200 in FIG. 2) determines that interference will occur and exceed the threshold should the service-acquiring radio technology use the selected channel (i.e., determination block 608="Yes"), in block 610, the dual-technology device may select another appropriate channel with the next highest power level for one of the radio technologies. In some embodiments, the channel selection in block 610 will be for the service-acquiring radio technology. In some embodiments, the channel selection in block 610 will be for the lower priority radio technology, such that if the service-acquiring radio technology has higher priority a channel for the lower priority radio technology that already has service will be selected in block 610. The channel selected in block 610 may be the appropriate channel having the highest power after the currently selected channel. Selecting the channel with the next highest power may help provide a better user experience, increasing the chances of a successful communication.

After selecting the channel with the next highest power in block 610, the dual-technology device 200 (e.g., co-existence manager 228) may again predict or otherwise determine whether the potential for interference on communications of one or both of the radio technologies exceeds a threshold level of potential interference if the service-acquiring radio technology uses the selected channel in determination block 608. If the dual-technology device (e.g., 200 in FIG. 2) again determines that interference will occur and exceed the threshold should the corresponding radio technology use the selected channel (i.e., determination block 608="Yes"), the dual-technology device may select the next highest power level for one of the radio technologies in block 610. This process of selecting a next highest power channel for one of the radio technologies and predicting the potential for interference may be repeated until there are no more suitable channels to select or interference is not predicted (i.e., determination block 608="No").

When the dual-technology device determines that interference will not occur or not exceed the threshold should the two radio technologies be connected using the selected channels (i.e., determination block 608="No"), the dual-technology device may connect the service-acquiring radio technology to its selected channel in block 612. In situations in which the service-acquiring radio technology has higher priority and thus another channel was selected for the already-connected radio technology in block 610, in block 612 the lower priority radio technology may be switched to that selected channel after which the service-acquiring radio technology may be connected to its selected channel (i.e., the channel selected in block 604).

In determination block 614, the dual-technology device may monitor communications and configurations to predict or otherwise determine whether the potential for interference that required a channel selection change in block 610 (i.e., the condition that cause determination block 608 conclude there would be interference) still exists and exceeds the threshold. This determination may continue so long as the potential for interference continues to exceed the threshold (i.e., determination block 614="Yes").

When the dual-technology device determines that the potential for interference that prompted the channel selection change no longer exists or exceeds the threshold (i.e., determination block 614="No"), the dual-technology device may switch the radio technology that was forced to select a lower power channel in block 610 to switch to the highest power channel available to that technology in block 616. For example, if the lower priority radio technology is operating on a lower power channel due to the operations of method 600, it may be allowed to switch to using its highest power available channel when the potential for interference has been removed or no longer exceeds the threshold. This may occur, for example, when one or both of the radio technologies handover to different cells (such as when the dual-technology device is moving) or when one of the radio technologies goes out of service or is shut down. Switching a radio technology to a highest power channel may include reassigning the radio technology to a different channel by updating a data structure that stores a relationship between the communication and the selected channel.

The processes of method 600 may be repeated soon after the lower priority radio technology is permitted to use its highest power channel in order to accommodate changes in circumstance affecting the potential for interference. For example, if one or both of the radio technologies is handed over to a new cell, different channels will be selected for one or both of the technologies. In other words, the events that permit switching the channel to the highest power channel in block 616 may involve one or both of the radio technologies re-acquiring service or transferring from one network cell to another. Thus, the dual-technology device may repeat the process beginning again with the operations described above with reference to block 602.

Figure 7:
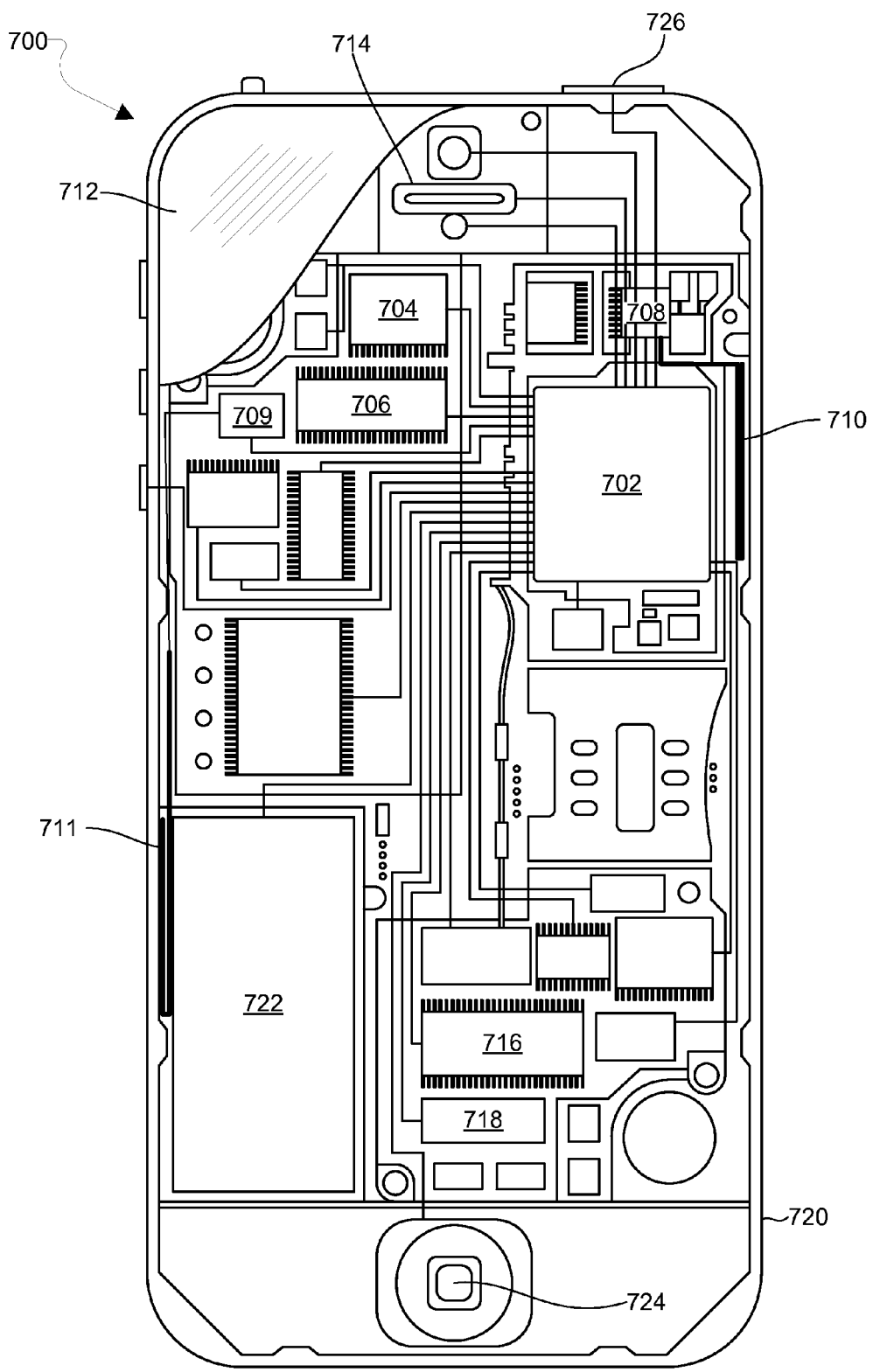
FIG. 7 is a component diagram of an example dual-technology wireless communication device suitable for use with the various embodiments.

FIG. 7 illustrates an exemplary mobile device, which may correspond to the dual-technology device 200 (e.g., FIG. 2) suitable for use with the various embodiments. The mobile device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The mobile device 700 may have two or more cellular network transceivers 708, 709 coupled to antennae 710, 711, for sending and receiving communications via a cellular communication network. The combination of the transceiver 708 or 709 and its associated antenna 710 or 711, and associated components, is referred to herein as a radio frequency (RF) chain. The cellular network transceivers 708, 709 may be coupled to the processor 702, which is configured with processor-executable instructions to perform operations of the embodiment methods described above. The cellular network transceivers 708, 709 and antennae 710, 711 may be used with the above-mentioned circuitry to implement the various wireless transmission protocol stacks and interfaces. The mobile device 700 may include one or more cellular network wireless modem chips 716 coupled to the processor and the cellular network transceivers 708, 709 and configured to enable communication via cellular communication networks.

The mobile device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile device 700 may also include speakers 714 for providing audio outputs. The mobile device 700 may also include a housing 720, constructed of a plastic, metal, or a combination of materials, for containing all or some of the components discussed herein. The mobile device 700 may include a power source 722 coupled to the processor 702, such as a disposable or rechargeable battery. The rechargeable battery may also be coupled to the peripheral device connection port to receive a charging current from a source external to the mobile device 700. The mobile device 700 may also include a physical button 724 for receiving user inputs. The mobile device 700 may also include a power button 726 for turning the mobile device 700 on and off.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for controlling communication in a mobile device, comprising:
   determining whether a potential for interference between a first communication on a first channel and a second communication on a second channel exceeds a threshold when:
      no more than one of the first communication or the second communication is a transmission,
      the first communication is an active communication, and
      the second communication is an inactive but pending communication scheduled to be active concurrently with the first communication;
   determining priorities for the first communication and the second communication to identify a higher priority communication and a lower priority communication;
   selecting a next highest power channel for the lower priority communication in response to determining that the potential for interference between the first communication and the second communication when only one of the first communication or the second communication is a transmission exceeds the threshold;
   determining whether a potential for interference between the first communication and the second communication exceeds the threshold when the lower priority communication uses the next highest power channel and only one of the first communication and the second communication is a transmission; and
   assigning the lower priority communication to the next highest power channel in response to determining that the potential for interference between the first communication and the second communication when the lower priority communication uses the next highest power channel does not exceed the threshold.

2. The method of claim 1, further comprising:
   repeating operations of selecting the next highest power channel for the lower priority communication and determining whether the potential for interference between the first communication and the second communication exceeds the threshold when the lower priority communication uses the next highest power channel and only one of the first communication or the second communication is a transmission until a power channel is selected for the lower priority communication for which the potential for interference between the first communication and the second communication does not exceed the threshold.

3. The method of claim 1, further comprising:
   assigning the lower priority communication to a highest power channel in response to determining that the potential for interference between the first communication and the second communication no longer exists.

4. The method of claim 1, wherein determining whether the potential for interference between the first communication on the first channel and the second communication on the second channel exceeds the threshold when only one of the first communication or the second communication is a transmission is based on the potential for interference between the first channel and the second channel and on a potential for interference with circuitry of the mobile device.

5. The method of claim 1, wherein determining whether the potential for interference between the first communication and the second communication exceeds the threshold includes effects of electromagnetic radiation emitted by circuitry of the mobile device other than an antenna.

6. A mobile device, comprising:
  a first radio frequency (RF) chain;
  a second RF chain; and
  a processor coupled to the first and second RF chains and configured to:
    determine whether a potential for interference between a first communication on the first RF chain using a first channel and a second communication on the second RF chain using a second channel exceeds a threshold when:
      no more than one of the first communication or the second communication is a transmission,
      the first communication is an active communication, and
      the second communication is an inactive but pending communication scheduled to be active concurrently with the first communication;
    determine priorities for the first communication and the second communication to identify a higher priority communication and a lower priority communication;
    select a next highest power channel for the lower priority communication in response to determining that the potential for interference between the first communication and the second communication when only one of the first communication or the second communication is a transmission exceeds the threshold;
    determine whether a potential for interference between the first communication and the second communication exceeds the threshold when the lower priority communication uses the next highest power channel and only one of the first communication and the second communication is a transmission; and
    assign the lower priority communication to the next highest power channel in response to determining that the potential for interference between the first communication and the second communication when the lower priority communication uses the next highest power channel does not exceed the threshold.

7. The mobile device of claim 6, wherein the processor is configured to repeat operations of selecting the next highest power channel for the lower priority communication and determining whether the potential for interference between the first communication and the second communication exceeds the threshold when the lower priority communication uses the next highest power channel and only one of the first communication or the second communication is a transmission until a power channel is selected for the lower priority communication for which the potential for interference between the first communication and the second communication does not exceed the threshold.

8. The mobile device of claim 6, wherein the processor is configured to assign the lower priority communication to a highest power channel in response to determining that the potential for interference between the first communication and the second communication no longer exists.

9. The mobile device of claim 6, wherein the processor is configured to determine whether the potential for interference between the first communication on the first channel and the second communication on the second channel exceeds the threshold when only one of the first communication or the second communication is a transmission is based on the potential for interference between the first channel and the second channel and on the potential for interference with circuitry of the mobile device.

10. The mobile device of claim 6, wherein the processor is configured to determine whether the potential for interference between the first communication and the second communication exceeds the threshold based on effects of electromagnetic radiation emitted by circuitry of the mobile device other than an antenna.

11. A non-transitory processor-readable medium having stored thereon processor-executable instructions when executed by a processor of a mobile device to perform operations comprising:
  determining whether a potential for interference between a first communication on a first channel and a second communication on a second channel exceeds a threshold when:
    no more than one of the first communication or the second communication is a transmission,
    the first communication is an active communication, and
    the second communication is an inactive but pending communication scheduled to be active concurrently with the first communication;
  determining priorities for the first communication and the second communication to identify a higher priority communication and a lower priority communication;
  selecting a next highest power channel for the lower priority communication in response to determining that the potential for interference between the first communication and the second communication when only one of the first communication or the second communication is a transmission exceeds the threshold;
  determining whether a potential for interference between the first communication and the second communication exceeds the threshold when the lower priority communication uses the next highest power channel and only one of the first communication and the second communication is a transmission; and
  assigning the lower priority communication to the next highest power channel in response to determining that the potential for interference between the first communication and the second communication when the lower priority communication uses the next highest power channel does not exceed the threshold.

12. The non-transitory processor-readable medium of claim 11, wherein the stored processor-executable instructions are configured to cause the processor of a mobile device to perform operations further comprising:
  repeating operations of selecting the next highest power channel for the lower priority communication and determining whether the potential for interference between the first communication and the second communication exceeds the threshold when the lower priority communication uses the next highest power channel and only one of the first communication or the second communication is a transmission until a power channel is selected for the lower priority communication for which the potential for interference between the first communication and the second communication does not exceed the threshold.

13. The non-transitory processor-readable medium of claim 11, wherein the stored processor-executable instructions are configured to cause the processor of a mobile device to perform operations further comprising:
  assigning the lower priority communication to a highest power channel in response to determining that the potential for interference between the first communication and the second communication no longer exists.

14. The non-transitory processor-readable medium of claim 11, wherein the stored processor-executable instructions are configured to cause the processor of a mobile device to perform operations such that determining whether the potential for interference between the first communication on the first channel and the second communication on the second channel exceeds the threshold when only one of the first communication or the second communication is a transmission is based on the potential for interference between the first channel and the second channel and on a potential for interference with circuitry of the mobile device.

15. The non-transitory processor-readable medium of claim 11, wherein the stored processor-executable instructions are configured to cause the processor of a mobile device to perform operations such that determining whether the potential for interference between the first communication and the second communication exceeds the threshold includes effects of electromagnetic radiation emitted by circuitry of the mobile device other than an antenna.

16. A mobile device, comprising:
means for determining whether a potential for interference between a first communication on a first channel and a second communication on a second channel exceeds a threshold when:
no more than one of the first communication or the second communication is a transmission,
the first communication is an active communication, and
the second communication is an inactive but pending communication scheduled to be active concurrently with the first communication;
means for determining priorities for the first communication and the second communication to identify a higher priority communication and a lower priority communication;
means for selecting a next highest power channel for the lower priority communication in response to determining that the potential for interference between the first communication and the second communication when only one of the first communication or the second communication is a transmission exceeds the threshold;
means for determining whether a potential for interference between the first communication and the second communication exceeds the threshold when the lower priority communication uses the next highest power channel and only one of the first communication and the second communication is a transmission; and
means for assigning the lower priority communication to the next highest power channel in response to determining that the potential for interference between the first communication and the second communication when the lower priority communication uses the next highest power channel does not exceed the threshold.

17. The mobile device of claim 16, further comprising:
means for repeating operations of selecting the next highest power channel for the lower priority communication and determining whether the potential for interference between the first communication and the second communication exceeds the threshold when the lower priority communication uses the next highest power channel and only one of the first communication or the second communication is a transmission until a power channel is selected for the lower priority communication for which the potential for interference between the first communication and the second communication does not exceed the threshold.

18. The mobile device of claim 16, further comprising:
means for assigning the lower priority communication to a highest power channel in response to determining that the potential for interference between the first communication and the second communication no longer exists.

19. The mobile device of claim 16, wherein means for determining whether the potential for interference between the first communication on the first channel and the second communication on the second channel exceeds the threshold when only one of the first communication or the second communication is a transmission comprises means for determining whether the potential for interference between the first communication on the first channel and the second communication on the second channel exceeds the threshold when only one of the first communication or the second communication is a transmission based on the potential for interference between the first channel and the second channel and on a potential for interference with circuitry of the mobile device.

20. The mobile device of claim 16, wherein means for determining whether the potential for interference between the first communication and the second communication exceeds the threshold comprises means for determining whether the potential for interference between the first communication and the second communication exceeds the threshold including effects of electromagnetic radiation emitted by circuitry of the mobile device other than an antenna.

* * * * *